United States Patent
McAlister

(10) Patent No.: US 9,091,373 B2
(45) Date of Patent: Jul. 28, 2015

(54) APPARATUSES AND METHODS FOR PROVIDING QUICK-CONNECTIONS WITH RETAINING FEATURES

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 53 days.

(21) Appl. No.: 13/826,331

(22) Filed: Mar. 14, 2013

(65) Prior Publication Data

US 2014/0265324 A1    Sep. 18, 2014

(51) Int. Cl.
*F16L 19/02*    (2006.01)
*F16L 37/10*    (2006.01)

(52) U.S. Cl.
CPC ............ *F16L 19/0231* (2013.01); *F16L 37/105* (2013.01); *Y10T 29/4987* (2015.01); *Y10T 29/49826* (2015.01); *Y10T 29/49895* (2015.01); *Y10T 29/49902* (2015.01); *Y10T 29/49908* (2015.01); *Y10T 29/49934* (2015.01)

(58) Field of Classification Search
CPC ............... F16L 19/0231; F16L 37/105; Y10T 29/49895; Y10T 29/49902; Y10T 29/49908; Y10T 29/4987; Y10T 29/49826; Y10T 29/49934

USPC .......... 29/520, 516, 506, 505, 428, 450, 468, 29/464; 285/355, 38, 93
See application file for complete search history.

(56) References Cited

U.S. PATENT DOCUMENTS 4,903,995 A * 2/1990 Blenkush et al. ............... 285/38
5,441,313 A * 8/1995 Kalahasthy ..................... 285/93

FOREIGN PATENT DOCUMENTS

CN            201032027      * 3/2008

* cited by examiner

*Primary Examiner* — John C Hong
(74) *Attorney, Agent, or Firm* — Perkins Coie LLP

(57) ABSTRACT

Fittings and coupling assemblies for relatively easy and quick connections to conduits are disclosed herein. A fitting assembly configured in accordance with an embodiment of the disclosure includes a male connector and a female connector that can be coupled together to form a fitting assembly for attachment to a conduit or tube. The male connector can include a retaining feature, such as an undulated barb, to correspond with a corresponding engagement feature, such as a tooth carried by a shroud of the female connector, to allow the male and female connectors to be rapidly coupled together and also prevent the connectors from unintentional loosening. To couple and also separate the male and female connectors, a user can apply a compressive force to at least one of the male and female connectors, followed by a partial rotation of one of the connectors.

20 Claims, 5 Drawing Sheets

(Section I-I)

(Section II-II)

(Section III-III)

(Section IV-IV)

APPARATUSES AND METHODS FOR PROVIDING QUICK-CONNECTIONS WITH RETAINING FEATURES

CROSS-REFERENCE TO RELATED APPLICATION(S)

The present application incorporates the following U.S. patent applications by reference in their entireties: U.S. patent application No. 13/826,773, filed Mar. 14, 2013, entitled "APPARATUSES AND METHODS FOR PROVIDING FINGER-TIGHTENED AND RATCHET-SECURED CONNECTIONS BETWEEN CONDUITS," and U.S. patent application Ser. No. 13/831,344, filed Mar. 14, 2013, entitled, "DYNAMIC SENSORS".

TECHNICAL FIELD

The following disclosure relates generally to fittings and couplings for fluid conveying conduits. More particularly, the present disclosure is directed to apparatuses and methods for providing quick-connections between fluid conveying conduits.

BACKGROUND

Fittings are frequently used to connect two objects, such as two or more tubes or a tube and a device that facilitates fluid communication with the tube. For example, a fitting can connect a valve to a tube such that the valve can regulate the flow of a fluid through the tube. Fittings may also be utilized to cap or plug an opening in a tube. To prevent a fluid from leaking, however, a fitting must maintain a seal with the tube while withstanding various environmental factors, including, for example, pressure, temperature, vibration, etc.

In various applications it is advantageous to provide a "quick connection" fitting between two tubes or related devices. For example, a quick connection fitting may be desirable for connecting fittings in hard to reach places that cannot be readily accessed by a wrench or other tightening tool. In another example, the quick connection fitting may provide for speedy connections when time is a concern, such as in healthcare, emergency services, and automotive racing applications. A quick connection fitting is so called because it may be manually connected and disconnected with relative ease.

One problem associated with conventional quick connection fittings, however, is that they may be susceptible to leakage. For example, leakage may occur as a result of degradation of an o-ring or a gasket forming a seal in the fitting. Leakage may also result from mechanical loosening of the fitting caused by thermal cycling or vibration. Leakage in a fluid conveying system is undesirable for many reasons.

DETAILED DESCRIPTION

Figure 1A:
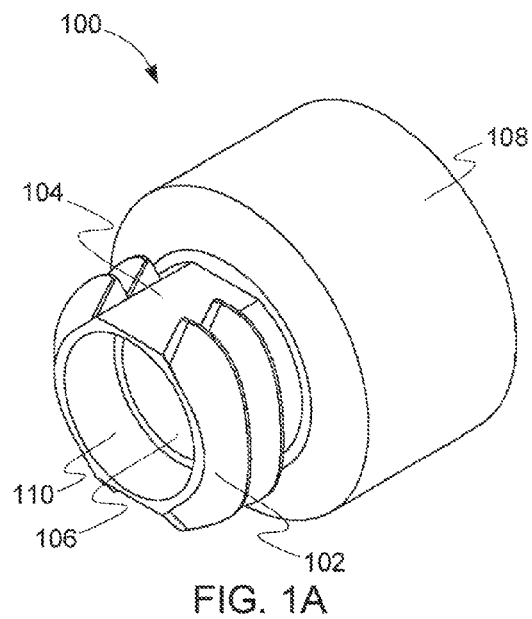
FIG. 1A is an isometric view of a male connector configured in accordance with an embodiment of the disclosure.

The present disclosure is directed generally to coupling or fitting assemblies including undulated or wave-like barbs or threaded portions. An apparatus configured in accordance with one aspect of the disclosure includes a first part, a second part, and an elastic element. The first part may comprise at least one retaining feature, such as an undulated barb having substantially constant radial spacing from a central longitudinal axis and a circular groove axially spaced from the at least one undulated barb. The at least one undulated barb may comprise at least one well section or trough section positioned between first and second crest sections. The first part also includes at least one channel aligned at least approximately parallel to the central longitudinal axis of the first part. The second part may comprise a housing or shroud. The shroud may be substantially cylindrical and comprise at least one tooth configured to fit within the at least one channel. Additionally, the elastic element may be adapted to be retained by the circular groove of the first part.

In certain embodiments, the first and second parts are configured to be coupled together for attachment to an end portion of a conduit. For example, the elastic element can be seated in the circular groove, and the first part can be inserted into the second part after the at least one tooth of the second part is aligned with the at least one channel of the first part. A compressive axial force can be applied between the first and second parts to compress the elastic element. The first part may be rotated relative to the second part until the at least one tooth is aligned with the at least one well section and the compressive axial force may be released.

Furthermore, according to further aspects of the disclosure, the first part and the second part are also configured to be easily and quickly decoupled from one another. For example, to decouple the first and second parts, a compressive axial force may be applied between the first part and the second part to compress the elastic element. The first part may be rotated relative to the second part until the at least one tooth is aligned with the at least one channel so that the first part may be retracted from the second part.

Embodiments of the present disclosure provide relatively easy and quick connections between fitting or coupling assemblies and conduits. In certain embodiments, a male connector and a female connector may be coupled together to form a fitting assembly for attachment to a conduit or tube. The male connector can include a retaining feature, such as an undulated barb feature, to correspond with a corresponding engagement feature such as a tooth carried by a shroud of the female connector to allow the male and female connectors to be rapidly coupled together and also prevent the connectors from loosening unintentionally. To separate the male and female connectors, a user can apply a compressive force to the male and female connectors, followed by a partial rotation of one of the connectors. As such, a user can simply to grab, squeeze, and turn one of the connectors to release the connection.

Figure 1B:
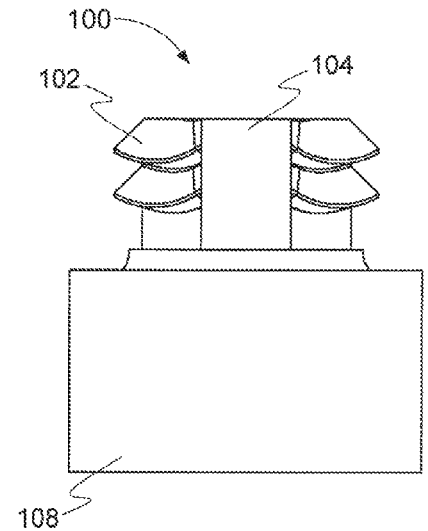
FIGS. 1B and 1C are side views and FIG. 1D is a top view of the male connector of FIG. 1A.
Figure 1C:
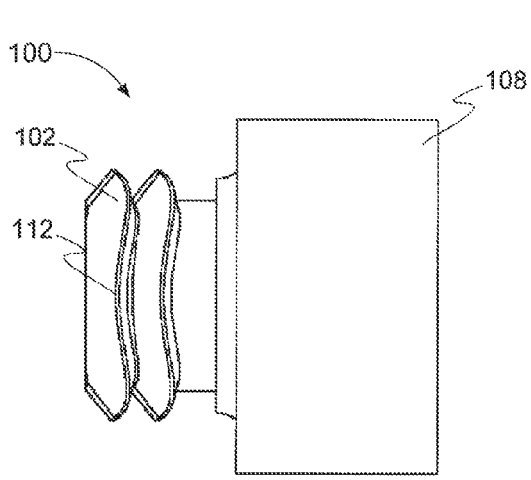
Figure 1D:
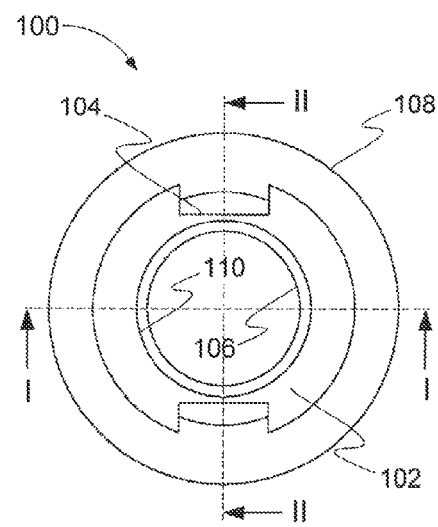

FIG. 1A is an isometric view of a male connector 100 configured in accordance with an embodiment of the disclosure. FIGS. 1B and 1C are side views and FIG. 1D is a top view of the male connector of FIG. 1A. Referring to FIGS. 1A-1D together, the male connector 100 may be formed from a variety of materials suitable for use with fluid conveying conduits including, for example, various metals, plastics, combinations of metals and plastics, etc. In certain embodiments, the male connector 100 includes one or more retaining features or undulated barbs 102, one or more channels 104, an internal bore 106, and a base 108. In some embodiments, the male connector 100 may further comprise a counterbore 110, as also shown in FIG. 1A.

The undulated barbs 102 may be located near the end of the male connector 100 opposite the base 108. The undulated barbs 102 facilitate coupling or joining the male connector 100 with other components or parts having corresponding coupling elements. As shown in the embodiment illustrated in FIG. 1D, the undulated barbs 102 have a substantially constant radial spacing from a central longitudinal axis of female connector 100. In certain embodiments, the undulated barbs 102 may comprise a waveform with ordinate displacement in a direction parallel to the central longitudinal axis. Ordinate displacement extrema extending away from the base 108 form barb wells 112, as shown in FIG. 1C. In certain embodiments, for example, the undulated barbs 102 can be threaded portions having a curved or wavelike edge portion. As such, a barb well 112 can be a crest section positioned between corresponding trough sections in the waveform shape of the undulated barb 102. More specifically, a crest section of the undulated barb 102 is positioned at a greater distance from the base 108 than the corresponding trough sections of the undulated barb 102 surrounding the crest section. In certain embodiments, the undulated barbs 102 may have a surface coating (e.g., dry lube, nylon, Teflon®, conditionally activated adhesive, grease, etc.) to lubricate, lock, seal, or conditionally lock the threaded section 102 with corresponding coupling elements.

In certain embodiments, the channels 104 may be formed by slots extending through the undulated barbs 102 such that every other barb well 112 (in circumferential order) is replaced by one of the channels 104. In the illustrated embodiment, for example, the channels 104 are positioned at an angle of approximately 90° from the barb wells 112. In other embodiments, however, the channels can be positioned at other angles relative to the barb wells 112. Alternatively, the channels 104 may be formed by slots that bisect ordinate displacement extrema extending toward the base 108 (not shown). The channels 104 in the illustrated embodiment extend in a direction generally parallel to the central longitudinal axis of the first connector 100. In alternative embodiments, however, the channels 104 may extend at a skewed angle relative to the central longitudinal axis. Moreover, the channels 104 may be configured such that corresponding coupling elements of the other pieces or parts may pass by the undulated barbs 102 during coupling or joining, as discussed in further detail below.

The internal bore 106 in the male connector 100 is configured to facilitate fluid (e.g., a liquid, gas, etc.) communication with a conduit. For example, in certain embodiments the internal bore 106 is configured to receive a tube or conduit. In other embodiments, however, the internal bore 106 may be omitted so that the male connector 100 may serve as a plug. As shown in the illustrated embodiment, the male connector 100 also includes a counterbore 110. The counterbore 110 is configured to accommodate various adapters, seal compounds, and other-purpose elements, as discussed in connection with FIGS. 3 and 4 below.

The base 108 is also configured to accommodate various structures when the male connector 100 is attached to a conduit. In one embodiment, for example, the male connector 100 may be attached to a conduit by the joining (e.g., welding, fitting, crimping, etc.) the base 108 to an end portion of a conduit. In another example, the base 108 may have internal or external threads to facilitate attachment to a compatibly threaded tube. In yet another embodiment, the base 108 may provide a gripping surface for fingers. For example, the outside of the base 108 may be knurled or otherwise textured. In accordance with a further embodiment, the base 108 may be configured to be compatible with certain tightening tools. For example, the base 108 may have a hexagonal cross-section to accommodate turning by a wrench, or a wall thickness suitable for crimping. As used herein the term "conduit" may refer to any type of tube or pipe that is suitable for conveying a fluid.

Figure 1E:
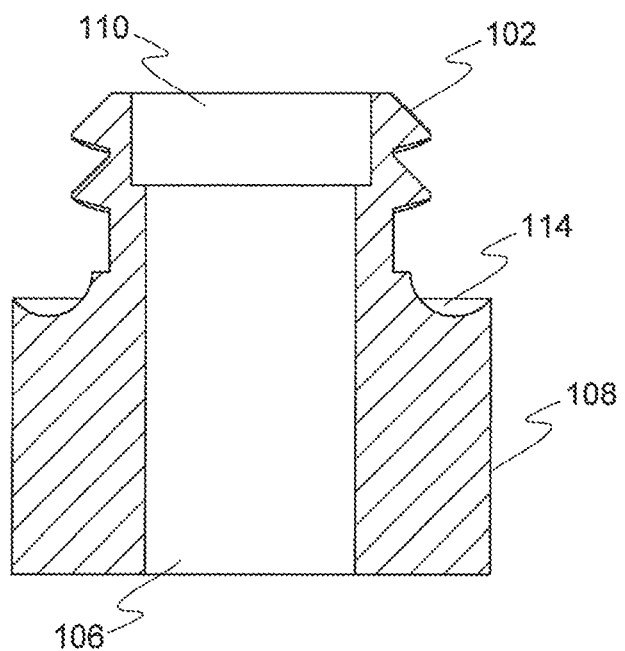
FIG. 1E is a side cross-sectional view of the male connector taken substantially along the line I-I of FIG. 1D.
Figure 1F:
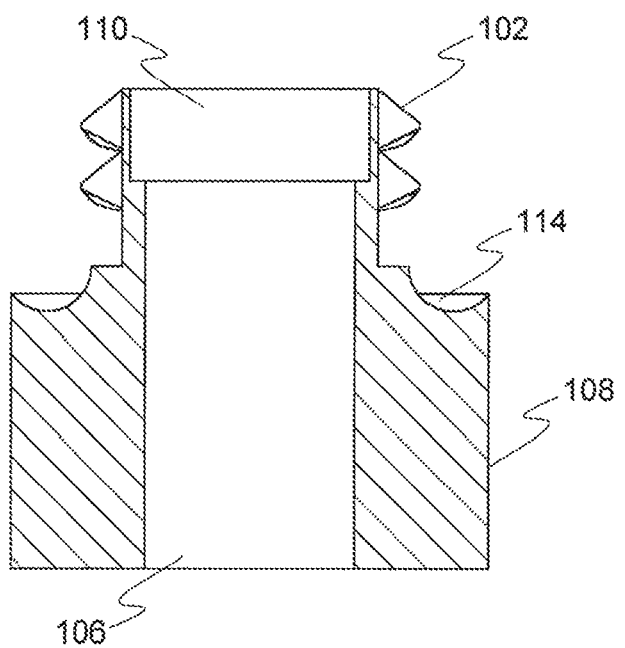
FIG. 1F is a side cross-sectional view of the male connector taken substantially along the line II-II of FIG. 1D.

FIG. 1E is a side cross-sectional view of the male connector taken substantially along the line I-I of FIG. 1D, and FIG. 1F is a side cross-sectional view of the male connector taken substantially along the line II-II of FIG. 1D. The embodiment shown in FIGS. 1E and 1F further illustrates the undulated barbs 102, the internal bore 106, the base 108, and the counter bore 110 of the male connector 100.

In addition, FIGS. 1E and 1F illustrate that the male connector 100 may comprise a compression ring groove 114, according to certain embodiments. The compression ring groove 114 may comprise a circumferential trough, channel, or groove that opens substantially away from the base 108. In certain embodiments the compression ring groove 114 is configured to retain or seat an elastic element, such as an O-ring or coil spring. The elastic element is described in further detail in connection with FIGS. 3 and 4. As shown in the illustrated embodiment, the compression ring groove 114 is axially spaced apart from the undulated barbs 102 toward the base 108. The compression ring groove 114 is also centered about the central longitudinal axis of the male connector 100 so as to be coaxial with the undulated barbs 102. In certain embodiments and as depicted in FIGS. 1E and 1F, the compression ring groove 114 may have a semicircular cross-section. In other embodiments, however, the compression ring groove 114 may have other suitable cross-sectional shapes, including, for example, rectilinear, rectangular, elliptical, triangular, irregular, etc. Additionally, in certain embodiments the compression ring groove 114 may be omitted or replaced by a flat surface that is generally perpendicular to the central longitudinal axis.

Figure 2A:
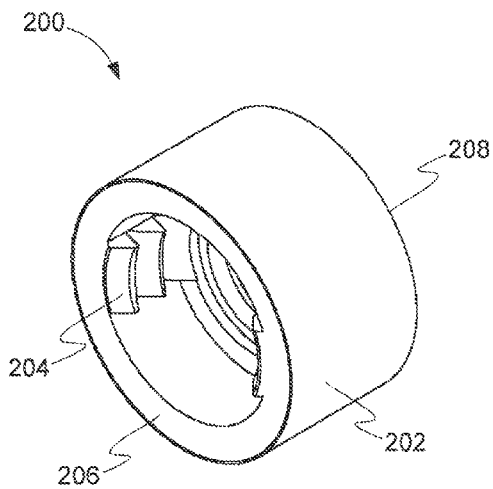
FIG. 2A is an isometric view of a female connector configured in accordance with an embodiment of the disclosure.
Figure 2B:
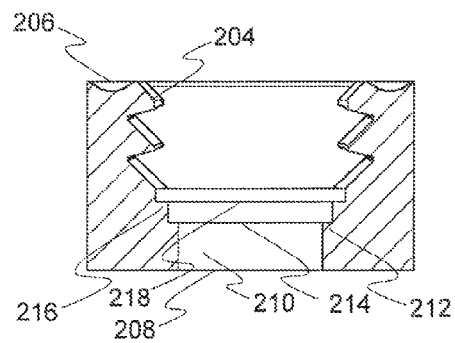
FIG. 2B is a side cross-sectional view of the female connector taken substantially along the line III-III of FIGS. 2D, and 2C is a side cross-sectional view of the female connector taken substantially along the line IV-IV of FIG. 2D.
Figure 2C:
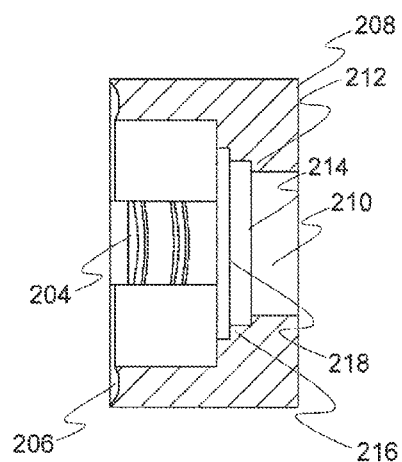
FIG. 2D is a top view of the female connector of FIG. 2A.
Figure 2D:
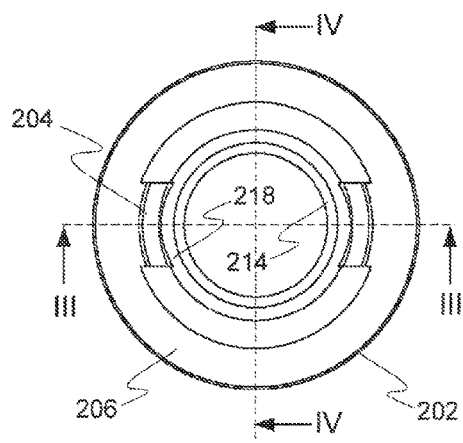

FIG. 2A is an isometric view and FIG. 2D is a top view of a female connector configured in accordance with an embodiment of the disclosure. FIG. 2B is a side cross-sectional view of the female connector taken substantially along the line III-III of FIGS. 2D, and 2C is a side cross-sectional view of the female connector taken substantially along the line IV-IV of FIG. 2D. Referring to FIGS. 2A-2D together, the female connector 200 may be fabricated from a variety of materials suitable for use with fluid conveying conduits including, for example, various metals, plastics, and/or of metals, plastics, etc. The female connector 200 comprises a shroud 202 and one or more engaging features or coupling teeth 204. In certain embodiments, the female connector 200 may further include a compression ring groove or seat 206 located opposite a base end 208. The illustrated female connector 200 further includes a central bore 210

The shroud 202 may be substantially cylindrical and extend axially from the base end 208 of the female connector 200. In certain embodiments, the shroud 202 is made from a relatively rigid material. The shroud 202 can also include external marking or texturing, such as knurling. For example, the marking or texturing may indicate an external location relative to the coupling teeth 204, which are described in further detail herein. In accordance with certain embodiments, the shroud 202 may be configured to be compatible with certain tightening tools. In one example, the shroud 202 may have a hexagonal shape (or other rectilinear shape) to accommodate turning by a wrench.

According to another aspect of the illustrated embodiment, the coupling teeth 204 may be configured to fit and move relatively freely within the channels 104 of the male connector 100. For example, the teeth 204 may slide through the channels 104 while a user inserts the male connector 100 into the female connector 200 during coupling or joining. Together, the coupling teeth 204 and the barb wells 112 act as a detent feature that prevents rotary motion between the male connector 100 and the female connector 200 until released. For example, a tooth 204 may be aligned with a barb well 112 when the female connector 200 is engaged with the male connector 100. This detent feature is discussed further in connection with reference to FIGS. 3 and 4.

The compression ring seat 206 may comprise a circumferential trough, channel, or groove that opens substantially away from the base end 208. Similar to the compression ring groove 114 described above, the compression ring seat 206 is configured to retain or seat an elastic element, which is described in further detail in connection with FIGS. 3 and 4. The compression ring seat 206 may be axially spaced apart from the coupling teeth 204 and located at or near a rim portion of the shroud 202. Moreover, the compression ring seat 206 may be centered about a central longitudinal axis of the female connector 200. In the illustrated embodiment, the compression ring seat 206 has a semicircular cross-sectional shape. In other embodiments, however, the compression ring seat 206 may have other suitable cross-sectional shapes, including, for example, rectilinear, rectangular, elliptical, triangular, irregular, etc. In still further embodiments, the compression ring seat 206 may be omitted or be replaced by a flat surface that is generally perpendicular to the central longitudinal axis.

The central bore 210 is configured to facilitate fluid communication through the female connector 200. For example, the central bore 210 may be configured to receive a tube such that the tube and the central bore 210 form a substantially continuous hollow channel for conveying a fluid (e.g., a liquid, gas, etc.). In other embodiments, however, the central bore 210 may be omitted such that the female connector 200 may serve as a cap. As shown in the illustrated embodiment, the female connector 200 also includes a first circumferential shoulder 212 that forms a retaining surface 214, and a second circumferential shoulder 216 that forms a stop surface 218. According to various embodiments, the first circumferential shoulder 212 and/or the second circumferential shoulder 216 may comprise a right-circular or chamfered shoulder. The first circumferential shoulder 212 and the second circumferential shoulder 216, as well as the retaining surface 214 and the stop surface 218, are discussed in further detail with reference to FIG. 4.

Figure 3:
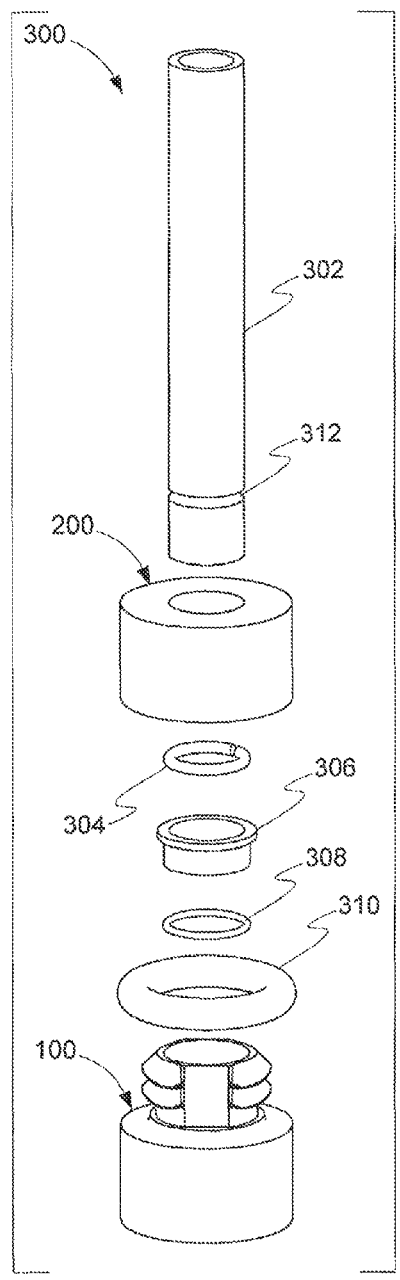
FIG. 3 is an exploded view of a fitting assembly configured in accordance with an embodiment of the disclosure.

Referring next to FIG. 3, FIG. 3 is an exploded view of a fitting assembly 300 configured in accordance with an embodiment of the disclosure. As shown in the illustrated embodiment, the assembly 300 includes a conduit 302, the female connector 200, a spring lock 304, a seal adapter 306, an O-ring 308, a compression ring 310, and the male connector 100. According to one aspect of the illustrated embodiment, the female connector 200 and the male connector 100 may be mutually exchanged in the order of assembly 300, such that the male connector 100 is between the conduit 302 and the spring lock 304, and the female connector is directly adjacent to the compression ring 310. In this embodiment, the male connector 100 may further include the first circumferential shoulder 212 and the second circumferential shoulder 216, as well as the retaining surface 214 and the stop surface 218.

The conduit 302 provides fluid communication such that a liquid, gas, or any other type of fluid may be conveyed from one location to another. Although the illustrated conduit 302 has a generally cylindrical shape, in other embodiments the conduit 302 may comprise a tee, cross, or elbow, according to various embodiments. The outer-diameter of the conduit 302 may be slightly smaller than the diameter of the central bore 210 and/or the internal bore 106. The conduit 302 may be formed of one or more of various suitable materials for transferring fluids, including, for example, ceramics, glass, metals, plastics, and/or combinations thereof. Furthermore, in certain embodiments the conduit 302 includes an annular groove 312 near an end portion of the conduit 302.

Figure 4A:
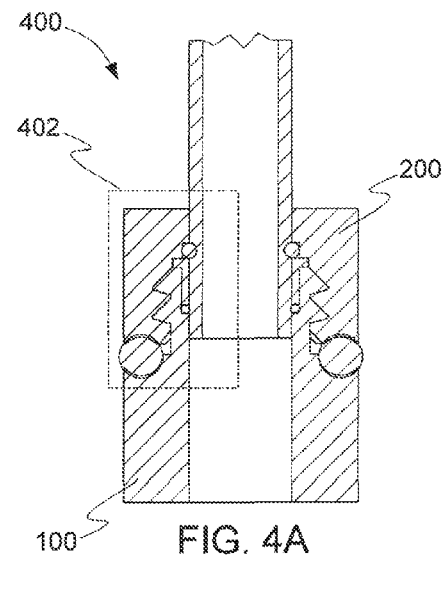
FIG. 4A is an enlarged side cross-sectional view of a portion of the fitting assembly of FIG. 3.
Figure 4B:
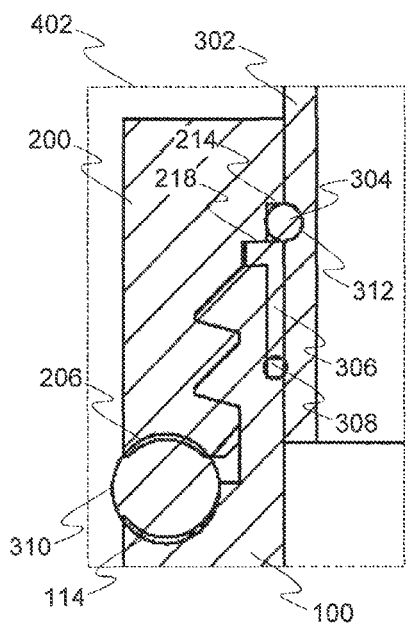
FIG. 4B is a detail view of a region of the fitting assembly of FIG. 4A.

The annular groove 312 may provide a location to secure the spring lock 304. In certain embodiments, the annular groove 310 may have a depth of approximately half the cross-sectional diameter of the spring lock 304, as shown in FIGS. 4A and 4B. The spring lock 304 may be lodged in the annular groove 312 by stretching the spring lock 304 over the end of the conduit 302 and sliding the spring lock 304 into the annular groove 312. With the spring lock 304 lodged in the annular groove 312, a fixed, circumferential protrusion near the end of the conduit 302 is provided. Alternatively, the tube 310 may be cold-formed or hot-formed to produce a circumferential protrusion. As described further herein, the circumferential protrusion may be invoked to retain the conduit 302 within the female connector 200 and/or the male connector 100. In alternate embodiments, the conduit 302 may comprise a flange at the end, rather than the annular groove 310, to provide the circumferential protrusion (not shown). The flange may be attached to the end of the conduit 302, for example, by welding, fusing, brazing, gluing, molding, swaging, etc.

According to the illustrated order of the components of the assembly 300, the conduit 302 may be inserted into the central bore 210 of the female connector 200. Subsequently, the spring lock 304 may be affixed to the conduit 302 using the annular groove 312. As such, spring lock 304 will prevent the female connector 200 from sliding off of the end of the conduit 302. Next, the seal adapter 306 may be slid over the end of the conduit 302, flanged-end first. In certain embodiments, the seal adapter 306 may be formed from a substantially rigid material, such as a metal, plastic, elastomeric, or other suitable material. Following the seal adapter 306, a seal, such as the O-ring 308, may be placed on the conduit 302 next. In one embodiment, the seal adapter 306 and the O-ring 308 may be combined into a single element or component. The O-ring 308 may be formed from an elastomeric material, relatively soft metals, or any other suitable rubber or thermoplastic material providing desired sealing characteristics. The compression ring 312 may be placed between the male connector 100 and the female connector 200 so as to be seated in, or retained by, the compression ring groove 114 and/or the compression ring seat 206. In some applications, such as those exposing the assembly 300 to high-temperature or corrosive environments, the compression ring 312 may be replaced by a metallic biasing member or spring, such as a stainless steel coil spring. Finally, the male connector 100 may be joined to the female connector 200.

As noted above, the male connector 100 and the female connector 200 are configured to be easily and quickly coupled or joined together for attachment to the conduit 300. After the compression ring 310 is seated in the compression ring groove 114 and/or the compression ring seat 206, the male connector 100 may be inserted into the female connector 200 by aligning the coupling teeth 204 with the channels 104. A user can then apply a compressive axial force to the male connector 100 and/or the female connector 200 to at least partially compress the compression ring 310. The male connector 100 may be rotated relative to the second part until the teeth 204 are aligned with the barb wells 112, at which point the compressive axial force may be released. In certain embodiments, the compressive axial force may be provided simply by twisting (i.e., rotating about the central longitudinal axis) the male connector 100 relative to the female connector 200 such that the teeth 204 follow contours of the undulated barbs 102 causing compression of the compression ring 310.

The male connector 100 and the female connector 200 are also configured to be decoupled or separated subsequent to coupling, in generally the opposite manner that they are coupled to one another. For example, a compressive axial force may be applied to the male connector 100 and/or the female connector 200 to at least partially compress the compression ring 310. The male connector 100 may be rotated relative to the female connector 200 until the teeth 204 are aligned with the channels 104. At this point the male connector 100 may then be retracted from the female connector 200. Additionally, in certain embodiments, the compressive axial force for decoupling may also be provided by twisting the male connector 100 relative to the female connector 200 such that the teeth 204 follow contours of the undulated barbs 102 causing compression of the compression ring 310.

FIG. 4A is an enlarged side cross-sectional view of a portion 400 of the fitting assembly 300 of FIG. 3, and FIG. 4B is a detail view of a region 402 of the fitting assembly of FIG. 4A. As shown in the illustrated embodiment, the retaining surface 214 abuts the spring lock 304 (or other circumferential protrusion extending from the conduit 302) so as to retain the conduit 302 within the central bore 210. A flanged end of the seal adapter 306 abuts, or nearly abuts, the opposite side of the spring lock 304 as well as the stop surface 218. The end opposite the flanged end of the seal adapter 306 fits within the counterbore 110 of the male connector 100. The O-ring 308 may be compressed by one or more of the seal adapter 306, the conduit 302, and the male connector 100, thereby forming a seal (e.g., a hermetic seal). Additionally, the compression ring 310 is retained by the compression ring groove 114 and the compression ring seat 206.

In certain embodiments, the seal adapter 306 and the O-ring 308 may be displaced away from each other by a considerable axial distance without leakage from the assembly 300. As such, the components of the assembly 300 (e.g., the conduit 302, the male connector 100, the adapter 306, the O-ring 308, the female connector 200, etc.) can accommodate significant axial displacement caused, for example, by thermal expansion and contraction, or subjection to high G-forces, etc. As such, the illustrated embodiment may accommodate extremely harmful conditions that would cause the connection at conventional tube and fitting seals to fail. Moreover, according to further embodiments, an easily distinguished indicator such as marking, coloring, or phosphorescent coating may be provided to enable inspection with an illuminating and/or activating light source that detects the longitudinal movement or position of components of the assembly 300. Such and indicator provides for easy inspection for preventative maintenance to maintain the system integrity.

Moreover, in certain embodiments the compression ring 310 can include one or more markings, such as colored stripes or dots. The markings may be configured to indicate whether the male connector 100 and the female connector 200 are properly coupled. For example, a portion of the compression ring 310 that is exposed (i.e., visible from outside of the assemblage 400) may appear white if the male connector 100 and the female connector 200 are properly coupled, but orange if the male connector 100 and the female connector 200 are improperly coupled or are beginning to decouple.

In one embodiment, a "tattletale" element can be included in the vicinity of the connection formed by the male connector 100 and the female connector 200. The tattletale element may comprise a detector or other indicator that a seal, such as that provided by the O-ring 308, has failed and leakage is beginning to occur. The leakage may be indicated, for example, by visual inspection of the connection, such as by a change in color of a component of the assembly 300 or a fluid leaking from the assembly 300. In another example, the leakage may be indicated in response to an interrogation signal sent by a detector device.

According to yet another feature of the embodiments of the assembly 300 and corresponding components described above, the assembly 300 allows relatively free rotary motion between connectors (e.g., the male connector 100 and the female connector 200) and tubing (e.g., the conduit 302). The free rotary motion may relieve torsional stresses that would potentially otherwise be present in the assembly 300. Such a configuration will enhance the assembly's 300 accommodation of thermal cycling, vibration, and fatigue as compared to conventional metal seals for tube and valve fittings.

Figure 5:
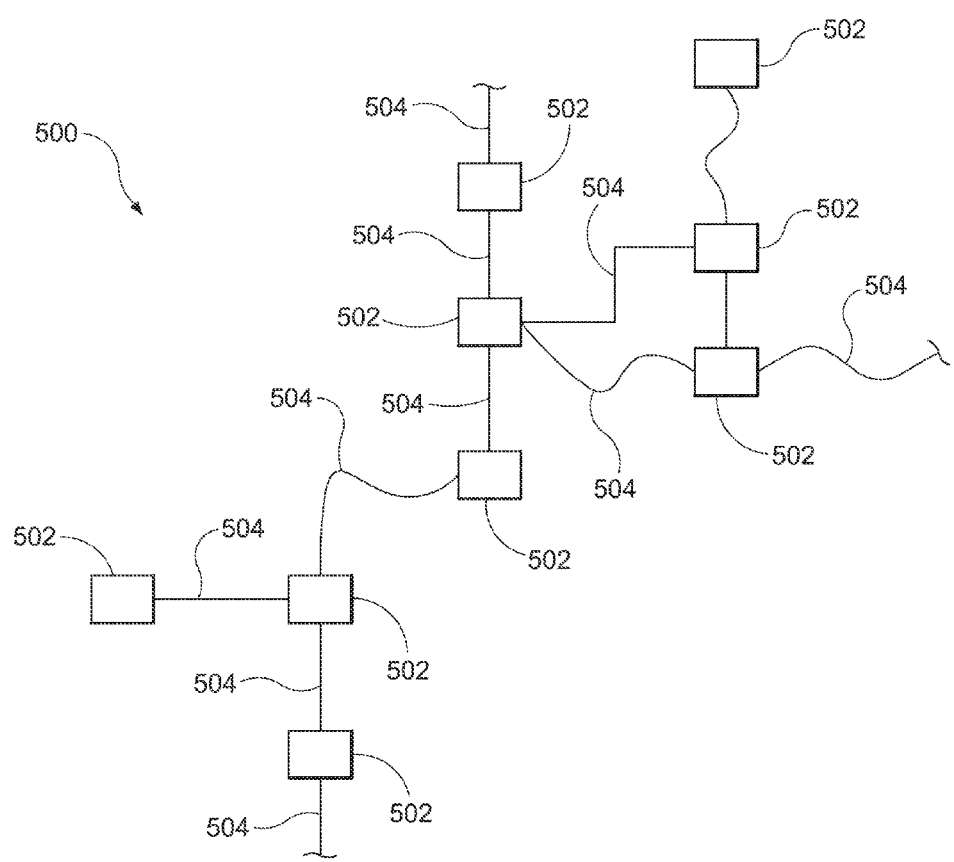
FIG. 5 is a schematic diagram of a fluid conduit system configured in accordance with an embodiment of the disclosure.

FIG. 5 is a schematic diagram of a fluid conduit system 500 configured in accordance with an embodiment of the disclosure. In the illustrated embodiment, the system 500 includes a plurality of fluid conveying conduits 504 that are joined to one another with corresponding fitting assemblies 502. The fitting assemblies 502 can also cap the end of a conduit 504. The fitting assemblies 502 in the illustrated system 500 can be generally similar to the fitting assemblies and associated components described above with reference to FIGS. 1A-4B. For example, the fitting assemblies 502 can include a male connector having retention features that rotatably engage corresponding engagement features of a female connector. According to another feature of the illustrated system 500, the conduits 504 can be generally straight or curved conduits. For example, the generally straight conduits 504 can include hard drawn tubes or pipes, and the curved conduits 504 can include annealed or soft tubes or pipes. The conduits 504 of the illustrated embodiment can be configured to be suitable for conveying or transporting various types of fluids (e.g., liquids, gases, etc.), for covering electrical cables or lines, or for any other application where conduits are commonly used. Moreover, the conduits 504 can be made from metallic, plastic, or any other suitable material.

EXAMPLES

1. An apparatus for providing a connection to a conduit, the apparatus comprising:
   a first part comprising a body having:
      a retaining feature extending partially around the body, wherein the retaining feature includes a generally undulating surface having a crest section positioned between first and second trough sections; and a channel in the body extending at least approximately parallel to a longitudinal axis of the body, wherein the channel intersects the retaining feature; and a second part comprising a generally cylindrical housing having an engagement feature configured to move through the channel, wherein the first and second parts are configured to be coupled together by aligning the engagement feature with the channel, at least partially inserting the first part into the second part, and rotating the second part to generally align the engagement feature with the crest section of the retaining feature.

2. The apparatus of example 1 wherein the body of the first part further comprises a groove axially spaced apart from the retaining feature and the second part comprises a seat, and wherein the apparatus further comprises a seal positioned in the groove, and wherein inserting the first part into the second part includes applying a compressive axial force to at least partially compress the seal between the groove and the seat.

3. The apparatus of example 2 wherein the first and second parts are further configured to be decoupled by applying the compressive axial force between the first and second parts to at least partially compress the seal, rotating the first part relative to the second part until the engagement feature is generally aligned with the channel, and retracting the first part from the second part.

4. The apparatus of example 1 wherein the retaining feature is a first retaining feature and the body further comprises a plurality retaining features axially spaced apart from one another, wherein each retaining feature includes a crest section positioned between corresponding first and second trough sections.

5. The apparatus of example 4 wherein the channel is a first channel and the apparatus further comprises:
a second channel generally similar to the first channel, wherein the second channel is positioned on the body generally opposite the first channel; and
a first set of retaining features on the body opposite a second set of retaining features, wherein the first and second channels are positioned between the first and second sets of retaining features.

6. The apparatus of example 1 wherein the retaining feature comprises a threaded portion of the body extending radially outward from the body, wherein the threaded portion includes a generally constant radial spacing from the longitudinal axis.

7. The apparatus of example 1 wherein the channel intersects the retaining feature proximate to the first trough section.

8. The apparatus of example 1 wherein the second part further comprises an interior bore configured to receive an end portion of a tube at least partially inserted into the interior bore.

9. The apparatus of example 8 wherein:
the body of the first part further comprises a first shoulder;
the housing of the second part further comprises a second shoulder axially spaced apart from a third shoulder; and
wherein the apparatus further comprises—
a first seal configured to contact the first shoulder;
a spring lock member configured to engage the end portion of the tube and contact the second shoulder;
a spring lock adapter positioned between the first seal and the spring lock member, wherein the spring lock adapter contacts the third shoulder and an end portion of the body; and a seal positioned in the groove, and wherein inserting the first part into the second part includes applying a compressive axial force to at least partially compress the seal between the housing.

10. The apparatus of example 8 wherein the interior bore comprises a first circumferential shoulder with a first diameter approximately equal to a second diameter of a circumferential protrusion carried by the end portion of the tube, the first circumferential shoulder forming a retaining surface proximate to one end of the second part.

11. The apparatus of example 10 wherein the interior bore further comprises a second circumferential shoulder axially spaced apart from the first circumferential shoulder, wherein the second circumferential shoulder has a third diameter greater that the first diameter, and wherein the second circumferential shoulder forms a stop surface.

12. The apparatus of example 11, further comprising a seal adapter having a front end and a back end, the seal adapter configured to engage the stop surface at the back end and to engage an O-ring at the front end.

13. An apparatus for providing a connection to a conduit, the apparatus comprising:
a first part comprising at least one undulated barb having substantially constant radial spacing from a longitudinal axis of the first part and at least one well section, a circular groove axially spaced apart from the undulated barb, and a channel approximately parallel to the longitudinal axis;
a second part comprising a generally cylindrical shroud having at least one tooth configured to move within the channel; and
a compression ring configured to be at least partially received in the circular groove, wherein the compression ring is made of an elastically deformable material, and wherein the first and second parts are configured to be coupled together by aligning the tooth with the channel, inserting the first part into the second part, at least partially compressing the compression ring by applying a compressive axial force between the first part and the second part, rotating the first part relative to the second part until the tooth is generally aligned with the well section, and releasing the compressive axial force.

14. The apparatus of example 13 wherein the first part and the second part are further configured to be decoupled by applying compressive axial force between the first part and the second part to at least partially compress the elastic element, rotating the first part relative to the second part until the tooth is generally aligned with the channel, and retracting the first part from the second part.

15. The apparatus of example 13 wherein the undulated barb is a first undulated barb, and the apparatus further comprises a plurality of undulated barbs axially spaced apart from the first undulated barb, wherein each of the undulated barbs includes one or more corresponding well sections.

16. The apparatus of example 13 wherein the first and second parts are configured to be coupled together around an end portion of a tube.

17. The apparatus of example 13 wherein the second part has a circular seat that is configured to at least partially retain the compression ring when the second part is coupled with the first part.

18. An apparatus for providing a connection to a conduit, the apparatus comprising:
a first part having a connector portion and a base portion, wherein the base portion includes a circular groove and the connector portion includes two axially spaced apart and coaxial barbs, wherein each of the two coaxial barbs includes undulations with ordinate displacement in a direction generally parallel to a longitudinal axis of the first part, and wherein the connector portion further includes slots extending in a direction generally parallel to the longitudinal axis, wherein the slots generally intersect the barbs;

a second part comprising a generally cylindrical shroud having a circular seat at a rim portion of the shroud and a plurality of teeth that are configured to fit within the slots; and a compression ring configured to be retained by the circular groove ad the circular seat, wherein the compression ring is formed from an elastically deformable material, and wherein the first and second parts are configured to be coupled together in a first position with the plurality of teeth engaged with corresponding ordinate displacement extrema of the undulations and the compression ring at least partially compressed between the first and second parts, and a second position with the plurality of teeth generally aligned with the corresponding channels slots to allow the second part to be removed from the first part.

19. A method for connecting a fitting assembly to a conduit, the method comprising:
seating a compression ring in a circular groove of a first part, wherein the compression ring is composed of a generally elastically deformable material;
aligning a tooth of a second part with a channel of the first part;
inserting the first part into the second part;
compressing the compression ring with the second part against the first part by applying a compressive axial force between the first part and the second part; and
rotating the first part relative to the second part until the tooth of the second part is generally aligned with at least one well section of the first part.

20. The method of example 19, further comprising releasing the compressive axial force after rotating the first part relative to the second part.

21. The method of example 21, further comprising:
recompressing the elastic element by reapplying the compressive axial force between the first and second parts;
rotating the first part relative to the second part until the tooth is aligned with the channel; and
retracting the first part from the second part.

22. The method of example 21 further comprising determining whether the compression ring is properly seated between the first and second parts based on one or more externally visible markings on the compression ring.

23. The method of example 21 wherein at least one of the first and second parts is configured to be removably attached to an end portion of a conduit.

24. The method of example 21 wherein inserting the first part into the second part further comprises positioning the compression ring in a circular seat in the second part.

25. A fluid conduit system comprising:
a first conduit for conveying a fluid;
a second conduit configured for conveying the fluid; and
a fitting assembly for coupling the first conduit to the second conduit for conveying the fluid therebetween, wherein the fitting assembly comprises—
a first part comprising a body having:
a retaining feature extending partially around the body, wherein the retaining feature includes a generally undulating surface having a crest section positioned between first and second trough sections; and
a channel in the body extending at least approximately parallel to a longitudinal axis of the body, wherein the channel intersects the retaining feature; and
a second part comprising a generally cylindrical housing having an engagement feature configured to move through the channel, wherein the first and second parts are configured to be coupled together by aligning the engagement feature with the channel, at least partially inserting the first part into the second part, and rotating the second part to generally align the engagement feature with the crest section of the retaining feature.

26. The fluid conduit system of example 25 wherein the first and second conduits are a first set of conduits and the fitting assembly is a first fitting assembly associated with the corresponding first set of conduits, and wherein the fluid conduit assembly further comprises:
a plurality of sets of conduits generally similar to the first set of conduits; and
a plurality of fitting assemblies, wherein each fitting assembly is generally similar to the first fitting assembly, and where individual fitting assemblies are associated with a corresponding set of conduits.

27. The fluid conduit system of example 25 wherein the body of the first part further comprises a groove axially spaced apart from the retaining feature and the second part comprises a seat, and wherein the apparatus further comprises a seal positioned in the groove, and wherein inserting the first part into the second part includes applying a compressive axial force to at least partially compress the seal between the groove and the seat.

28. The fluid conduit system of example 25 wherein the first and second parts are further configured to be decoupled by applying the compressive axial force between the first and second parts to at least partially compress the seal, rotating the first part relative to the second part until the engagement feature is generally aligned with the channel, and retracting the first part from the second part.

29. The fluid conduit system of example 25 wherein the retaining feature is a first retaining feature and the body further comprises a plurality retaining features axially spaced apart from one another, wherein each retaining feature includes a crest section positioned between corresponding first and second trough sections.

30. The fluid conduit system of example 25 wherein the channel is a first channel and the apparatus further comprises:
a second channel generally similar to the first channel, wherein the second channel is positioned on the body generally opposite the first channel; and
a first set of retaining features on the body opposite a second set of retaining features, wherein the first and second channels are positioned between the first and second sets of retaining features.

From the foregoing, it will be appreciated that specific embodiments of the disclosure have been described herein for purposes of illustration, but that various modifications may be made without deviating from the spirit or scope of the various embodiments of the disclosure. For example, embodiments of the present disclosure may provide a secure, vibration resistant electrical connection between two coaxial cables. Further, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited except as by the appended claims.

I claim:

1. A method for connecting a fitting assembly to a conduit, the method comprising:
   seating a compression ring in a circular groove of a first part, wherein the compression ring is composed of a generally elastically deformable material;
   aligning a tooth of a second part with a channel of the first part;
   inserting the first part into the second part;
   compressing the compression ring with the second part against the first part by applying a compressive axial force between the first part and the second part;
   rotating the first part relative to the second part until the tooth of the second part is generally aligned with at least one well section of the first part;
   releasing the compressive axial force after rotating the first part relative to the second part; and
   wherein at least one of the first and second parts is configured to be removably attached to an end portion of a conduit.

2. The method of claim 1, further comprising:
   recompressing the compression ring by reapplying the compressive axial force between the first and second parts;
   rotating the first part relative to the second part until the tooth is aligned with the channel; and
   retracting the first part from the second part.

3. The method of claim 1 further comprising determining whether the compression ring is properly seated between the first and second parts based on one or more externally visible markings on the compression ring.

4. A method for connecting a fitting assembly to a conduit, the method comprising:
   seating a compression ring in a circular groove of a first part, wherein the compression ring is composed of a generally elastically deformable material;
   aligning a tooth of a second part with a channel of the first part;
   inserting the first part into the second part;
   compressing the compression ring with the second part against the first part by applying a compressive axial force between the first part and the second part;
   rotating the first part relative to the second part until the tooth of the second part is generally aligned with at least one well section of the first part;
   releasing the compressive axial force after rotating the first part relative to the second part; and
   wherein inserting the first part into the second part further comprises positioning the compression ring in a circular seat in the second part.

5. The method of claim 4 further comprising:
   recompressing the compression ring by reapplying the compressive axial force between the first and second parts;
   rotating the first part relative to the second part until the tooth is aligned with the channel; and
   retracting the first part from the second part.

6. The method of claim 4 further comprising determining whether the compression ring is properly seated between the first and second parts based on one or more externally visible markings on the compression ring.

7. A method for connecting a fitting assembly to a conduit, the method comprising:
   seating an elastic element in a groove of a first part;
   aligning an engagement feature of a second part with a channel of the first part;
   inserting the first part at least partially into the second part;
   compressing the elastic element with the second part against the first part by applying a compressive axial force between the first part and the second part;
   rotating the first part relative to the second part until the engagement feature of the second part is generally aligned with at least one well section of the first part;
   releasing the compressive axial force after rotating the first part relative to the second part; and
   recompressing the elastic element by reapplying the compressive axial force between the first and second parts;
   rotating the first part relative to the second part until the engagement feature is aligned with the channel; and
   retracting the first part from the second part.

8. The method of claim 7 further comprising determining whether the elastic element is properly seated between the first and second parts based on one or more externally visible markings on the elastic element.

9. The method of claim 7 wherein inserting the first part into the second part further comprises positioning the elastic element in a groove in the second part.

10. A method for connecting a fitting assembly to a conduit, the method comprising:
    seating an elastic element in a groove of a first part;
    aligning an engagement feature of a second part with a channel of the first part;
    inserting the first part at least partially into the second part;
    compressing the elastic element with the second part against the first part by applying a compressive axial force between the first part and the second part;
    rotating the first part relative to the second part until the engagement feature of the second part is generally aligned with at least one well section of the first part;
    releasing the compressive axial force after rotating the first part relative to the second part; and
    wherein at least one of the first and second parts is configured to be removably attached to an end portion of a conduit.

11. The method of claim 10 further comprising determining whether the elastic element is properly seated between the first and second parts based on one or more externally visible markings on the elastic element.

12. The method of claim 10 wherein inserting the first part into the second part further comprises positioning the elastic element in a groove in the second part.

13. The method of claim 12 wherein the elastic element comprises a compression ring configured to be retained within the grooves of the first and second parts.

14. The method of claim 13 wherein the grooves comprise a circumferential configuration.

15. The method of claim 10 wherein the engagement feature comprises at least one tooth.

16. The method of claim 10 wherein the well section comprises a crest section positioned between corresponding first and second trough sections.

17. A method for connecting a fitting assembly to a conduit, the method comprising:
    seating a compression ring in a circular groove of a first part, wherein the first part comprises at least one undulated barb having substantially constant radial spacing from a longitudinal axis of the first part and at least one well section, a circular groove axially spaced apart from the undulated barb, and a channel approximately parallel to the longitudinal axis;

aligning an engagement feature of a second part with the channel of the first part, wherein the second part comprises a generally cylindrical shroud;

inserting the first part into the second part;

compressing the compression ring with the second part against the first part by applying a compressive axial force between the first part and the second part; and rotating the first part relative to the second part until the engagement feature of the second part is generally aligned with the at least one well section of the first part.

18. The method of claim 17 wherein the first and second parts are configured to be coupled together around an end portion of a conduit.

19. The method of claim 17 further comprising releasing the compressive axial force after rotating the first part relative to the second part.

20. The method of claim 19 further comprising:

recompressing the compression ring by reapplying the compressive axial force between the first and second parts;

rotating the first part relative to the second part until the engagement feature is aligned with the channel; and retracting the first part from the second part.

\* \* \* \* \*